US011263375B2

(12) United States Patent
Chuang et al.

(10) Patent No.: US 11,263,375 B2
(45) Date of Patent: Mar. 1, 2022

(54) CONSTRAINT DETERMINATION SYSTEM AND METHOD FOR SEMICONDUCTOR CIRCUIT

(71) Applicants: TAIWAN SEMICONDUCTOR MANUFACTURING CO., LTD., Hsinchu (TW); TSMC NANJING COMPANY LIMITED, Nanjing (CN)

(72) Inventors: Yi-Lin Chuang, Taipei (TW); Shi-Wen Tan, Nanjing (CN); Szu-Ju Huang, Hsinchu County (TW); Shih-Feng Hong, Taipei (TW)

(73) Assignees: TAIWAN SEMICONDUCTOR MANUFACTURING CO., LTD., Hsinchu (TW); TSMC NANJING COMPANY LIMITED, Nanjing (CN)

( * ) Notice: Subject to any disclaimer, the term of this patent is extended or adjusted under 35 U.S.C. 154(b) by 41 days.

(21) Appl. No.: 16/917,600

(22) Filed: Jun. 30, 2020

(65) Prior Publication Data
US 2021/0365620 A1 Nov. 25, 2021

(30) Foreign Application Priority Data
May 21, 2020 (CN) .......................... 202010435223.6

(51) Int. Cl.
G06F 30/31 (2020.01)
G06F 111/04 (2020.01)
G06F 111/06 (2020.01)

(52) U.S. Cl.
CPC .......... *G06F 30/31* (2020.01); *G06F 2111/04* (2020.01); *G06F 2111/06* (2020.01)

(58) Field of Classification Search
CPC ... G06F 30/31; G06F 2111/06; G06F 2111/04
See application file for complete search history.

(56) References Cited

U.S. PATENT DOCUMENTS 6,880,138 B1 * 4/2005 Teig ...................... G06F 30/367
716/115
2007/0016881 A1 * 1/2007 Gregory .............. G06F 30/3312
716/108

OTHER PUBLICATIONS

Kahng et al., "A No. Human-in-the-Loop Methodology Toward Optimal Utilization of EDA Tools and Flows", Proc. DAC, WIP Track, 2018, to appear.

* cited by examiner

*Primary Examiner* — Nghia M Doan
(74) *Attorney, Agent, or Firm* — Maschoff Brennan

(57) ABSTRACT

A method, for determining constraints related to a target circuit, includes following operations. First circuit speed results of the target circuit under different candidate constraint configurations are accumulated. Breakthrough probability distributions relative to each of the candidate constraint configurations are determined according to the first circuit speed results. First selected constraint configurations are determined from the candidate constraint configurations by sampling the breakthrough probability distributions. A first budget distribution is determined among the first selected constraint configurations. In response to that the first budget distribution is converged, the first selected constraint configurations in the first budget distribution is utilized for implementing the target circuit and generating an updated circuit speed result of the target circuit.

20 Claims, 11 Drawing Sheets

| | $C_{1A}$ | $C_{1B}$ | $C_{1C}$ | $C_{1D}$ | $C_{1E}$ |
|---|---|---|---|---|---|
| SAMP1 | 0.42 | 0.75 | 0.34 | 0.03 | 0.12 |
| SAMP2 | 0.36 | 0.60 | 0.74 | 0.20 | 0.08 |
| SAMP3 | 0.83 | 0.65 | 0.30 | 0.33 | 0.07 |
| SAMP4 | 0.67 | 0.71 | 0.45 | 0.28 | 0.02 |
| SAMP5 | 0.44 | 0.66 | 0.34 | 0.19 | 0.17 |

FIG. 6

| | $C_{1A}$ | $C_{1B}$ | $C_{1C}$ | $C_{1D}$ | $C_{1E}$ |
|---|---|---|---|---|---|
| counts | 1 | 3 | 1 | - | - |

| | $C_{1A}$ | $C_{1B}$ | $C_{1C}$ | $C_{1D}$ | $C_{1E}$ |
|---|---|---|---|---|---|
| SAMP1 | 0.22 | 0.80 | 0.50 | 0.43 | 0.11 |
| SAMP2 | 0.11 | 0.50 | 0.47 | 0.62 | 0.02 |
| SAMP3 | 0.43 | 0.25 | 0.65 | 0.44 | 0.09 |
| SAMP4 | 0.57 | 0.71 | 0.75 | 0.38 | 0.12 |
| SAMP5 | 0.34 | 0.66 | 0.24 | 0.10 | 0.13 |

| | $C_{1A}$ | $C_{1B}$ | $C_{1C}$ | $C_{1D}$ | $C_{1E}$ |
|---|---|---|---|---|---|
| counts | - | 2 | 2 | 1 | - |

BD2

| | $C_{1A}$ | $C_{1B}$ | $C_{1C}$ | $C_{1D}$ | $C_{1E}$ |
|---|---|---|---|---|---|
| budget counts | 1 | 3 | 1 | - | - |

BD1

| | $C_{1A}$ | $C_{1B}$ | $C_{1C}$ | $C_{1D}$ | $C_{1E}$ |
|---|---|---|---|---|---|
| budget counts | - | 2 | 2 | 1 | - |

BD2

| | $C_{1A}$ | $C_{1B}$ | $C_{1C}$ | $C_{1D}$ | $C_{1E}$ |
|---|---|---|---|---|---|
| budget counts | 1 | 1 | 3 | - | - |

BD3

| | $C_{1A}$ | $C_{1B}$ | $C_{1C}$ | $C_{1D}$ | $C_{1E}$ |
|---|---|---|---|---|---|
| budget counts | - | 4 | 1 | - | - |

CONSTRAINT DETERMINATION SYSTEM AND METHOD FOR SEMICONDUCTOR CIRCUIT

CROSS-REFERENCE TO RELATED APPLICATION

This application claims priority to China Application Serial Number 202010435223.6, filed May 21, 2020, which is herein incorporated by reference.

BACKGROUND

The field of IC design has advanced to allow designers to rapidly design and verify circuits, with extensive use of standard, reusable components and design flows. Electronic Design Automation (EDA) tools allow the designer to develop a design at a relatively high level of abstraction (e.g., register transfer-level (RTL) or gate-level), generate a transistor-level schematic level design, and verify performance at the transistor level (a pre-layout simulation). Then the tool generates a layout of a target circuit under some given constraints. Afterwards, the tool performs various verification tasks, such as design rule checks (DRC) and layout-versus schematic (LVS) checks, to the target circuit. After the DRC and LVS verifications, some performance parameters of the target circuit can be evaluated by the EDA tools. The performance parameters may include circuit speed results, parasitic resistances, parasitic capacitances, etc. The constraints given to the target circuit will affect the performance parameters.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a schematic diagram illustrating relationships between breakthrough probabilities under the candidate constraint configurations in aforesaid five runs of sampling.

FIG. 7 is a schematic diagram illustrating a combination of the candidate constraint configurations in a budget distribution determined according to the sampling results in FIG. 6.

FIG. 12 is a schematic diagram illustrating the budget distributions determined in the four recursive inner-agent rounds.

DETAILED DESCRIPTION

Figure 1:
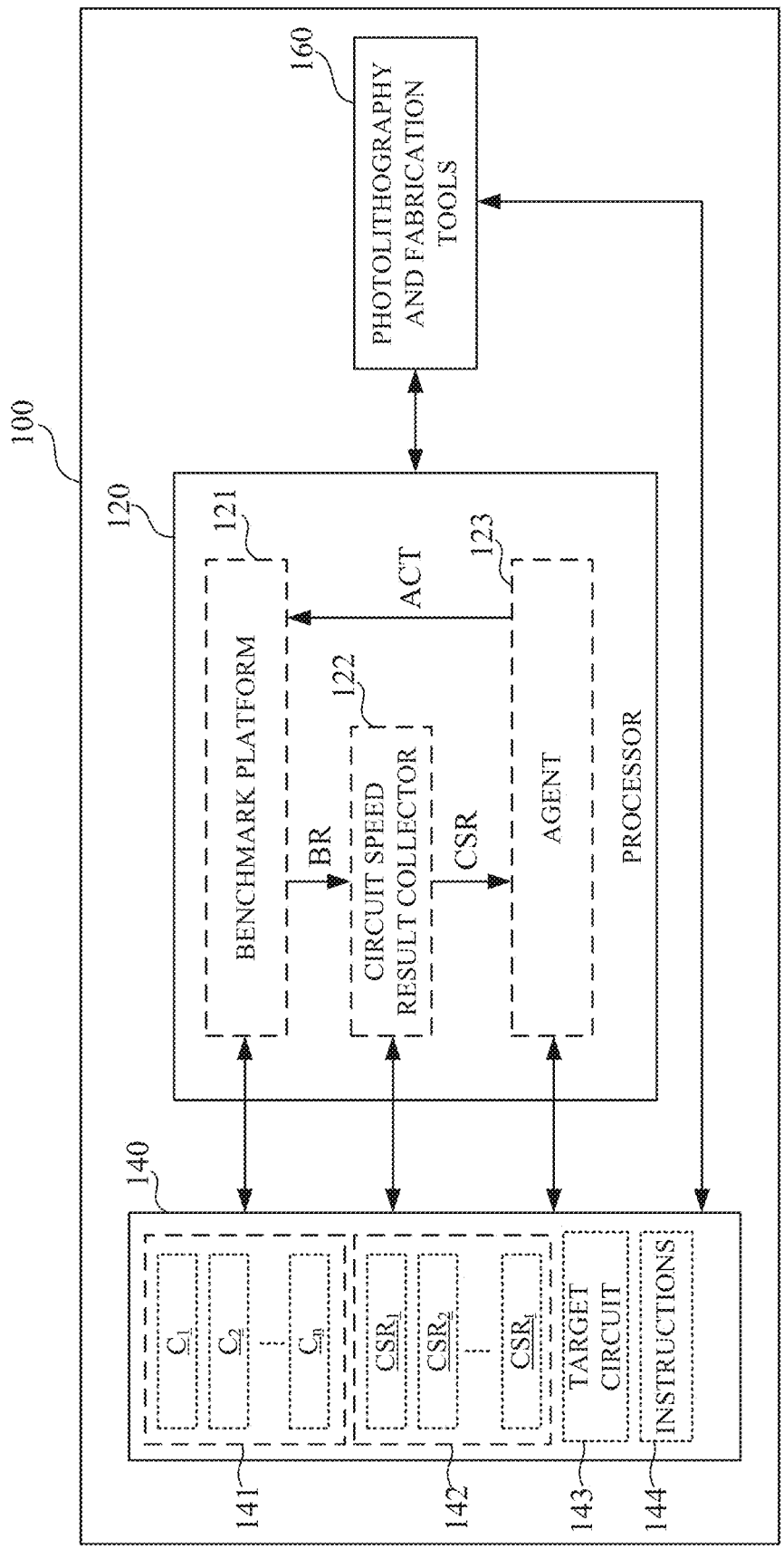
FIG. 1 is a schematic diagram of a system in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

FIG. 1 is a schematic diagram of a system in accordance with various embodiments of the present disclosure. In some embodiments, the system 100 is utilized in a design procedure or a fabrication procedure of a target circuit 143. In some embodiments, the target circuit 143 can be an integrated circuit including circuit components, such as memory cells, current mirrors, switches, adders, multiplexers, converters, application-specific integrated circuits (ASIC), general purpose processors, graphic processors or any equivalent circuit component. In some embodiments, the system 100 is configured to suggest or optimize at least one constraint to be applied on the target circuit 143.

The target circuit 143 usually includes various active devices such as transistors and/or other devices such as resistors, capacitors, or other suitable circuit components. These devices are often formed using one or more material layers formed over and/or within a substrate. Patterning techniques are used to pattern each of several material layers to form the various components and interconnect them through dielectric materials.

Techniques have been developed to represent integrated circuit designs at various levels of abstraction. According to these techniques, a designed integrated circuit is capable of being represented as a schematic diagram or as a layout. A schematic diagram is an electronic diagram of a designed integrated circuit. Schematic diagrams often include symbols that represent circuit components such as transistors, resistors, capacitors, or other circuit components. Schematic diagrams also often include representations of the connections between the circuit components included in the schematic diagram. A layout is a representation of an integrated circuit in terms of planar geometric shapes that correspond to the patterns of materials such as metal, oxide, or semiconductor layers that make up the components of the integrated circuit. To form an integrated circuit, a layout of each of several different device layers is often generated from the schematic.

Integrated circuit designers often rapidly design and verify circuits, with extensive use of standard, reusable components and design flows. Electronic design automation (EDA) tools allow designers to develop an integrated circuit design at the schematic level and verify performance at the schematic level via a pre-layout simulation. If the pre-layout simulation demonstrates that the integrated circuit design at the schematic level meets specified performance characteristics, EDA tools generate a layout and perform verification tasks such as design rule checks (DRC) and/or layout versus schematic (LVS) checks.

In order to simulate and/or verify performances of the target circuit 143, the EDA tools must have some information about some constraints applied on the target circuit 143. For example, theses constraints may include CLK_PER (clock period or cycle time), FMAX (maximum clocking frequency), TSU (setup time), TCO (clock-to-output time), bit-width, trace-width, system voltage levels, etc. These constraints are configured to define an environment or a manufacturing technology related to the target circuit 143. Usually, when the target circuit 143 is simulated or synthesized under different constraint sets in multiple EDA rounds, performance results of the target circuit in these EDA rounds will be different due to the difference of the constraints.

Some EDA tools simulate the target circuits and the components thereof with fixed constraint configurations. In these cases, the designer cannot know whether the target circuit can achieve a better performance under a different set of constraint configurations.

Some EDA tools make it possible for a designer to manually input estimated constraint configurations for circuit components at the schematic generation stage based on experience or knowledge. In some embodiments, for complicated or large-scale target circuits, it may takes a long time (e.g., a few days) to complete one EDA simulation round. If the designer wants to try different sets of constraint configurations, the designer must try a couple of EDA simulation rounds. Systems or EDA tools without capabilities to suggest optimized constraints often output pre-layout simulation results with lower performance results, and it will increase the amount of time a designer spends when designing, and simulating the performance of, the target circuit 143.

As illustrated in FIG. 1, the system 100 includes a processor 120 and a non-transitory computer readable storage medium 140. The processor 120 is communicatively coupled with the non-transitory computer readable storage medium 140. The non-transitory computer readable storage medium 140 is encoded with, i.e., storing, a constraint library 141, a circuit speed result library 142, a layout design of the target circuit 143 and instructions 144 and any intermediate data for executing the set of instructions 144.

The processor 120 is configured to execute the set of instructions 144 encoded in the computer readable storage medium 140 in order to establishing a benchmark platform 121, a circuit speed result collector 122 and an agent 123 as illustrated in FIG. 1. The benchmark platform 121, the circuit speed result collector 122 and the agent 123 are utilized as a layout designing tool for designing, verifying or simulating the target circuit 143.

In some embodiments, the processor 120 is a central processing unit (CPU), a multi-processor, a distributed processing system, an application specific integrated circuit (ASIC), and/or a suitable processing unit. In some embodiments, the benchmark platform 121 includes a software-based electronic design automation (EDA) tool executed by the processor 120. In some embodiments, the circuit speed result collector 122 includes a software-based application program executed by the processor 120. In some embodiments, the agent 123 includes a software-based reinforcement-learning agent or machine-learning agent executed by the processor 120. The benchmark platform 121, the circuit speed result collector 122 and the agent 123 in some embodiments can be implemented by the instructions 144 executed by the processor 120.

In some embodiments, the computer readable storage medium 140 is an electronic, magnetic, optical, electromagnetic, infrared, and/or a semiconductor system (or apparatus or device). For example, the computer readable storage medium 140 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 140 includes a compact disk-read only memory (CD-ROM), a compact disk-read/write (CD-R/W), and/or a digital video disc (DVD).

Figure 2:
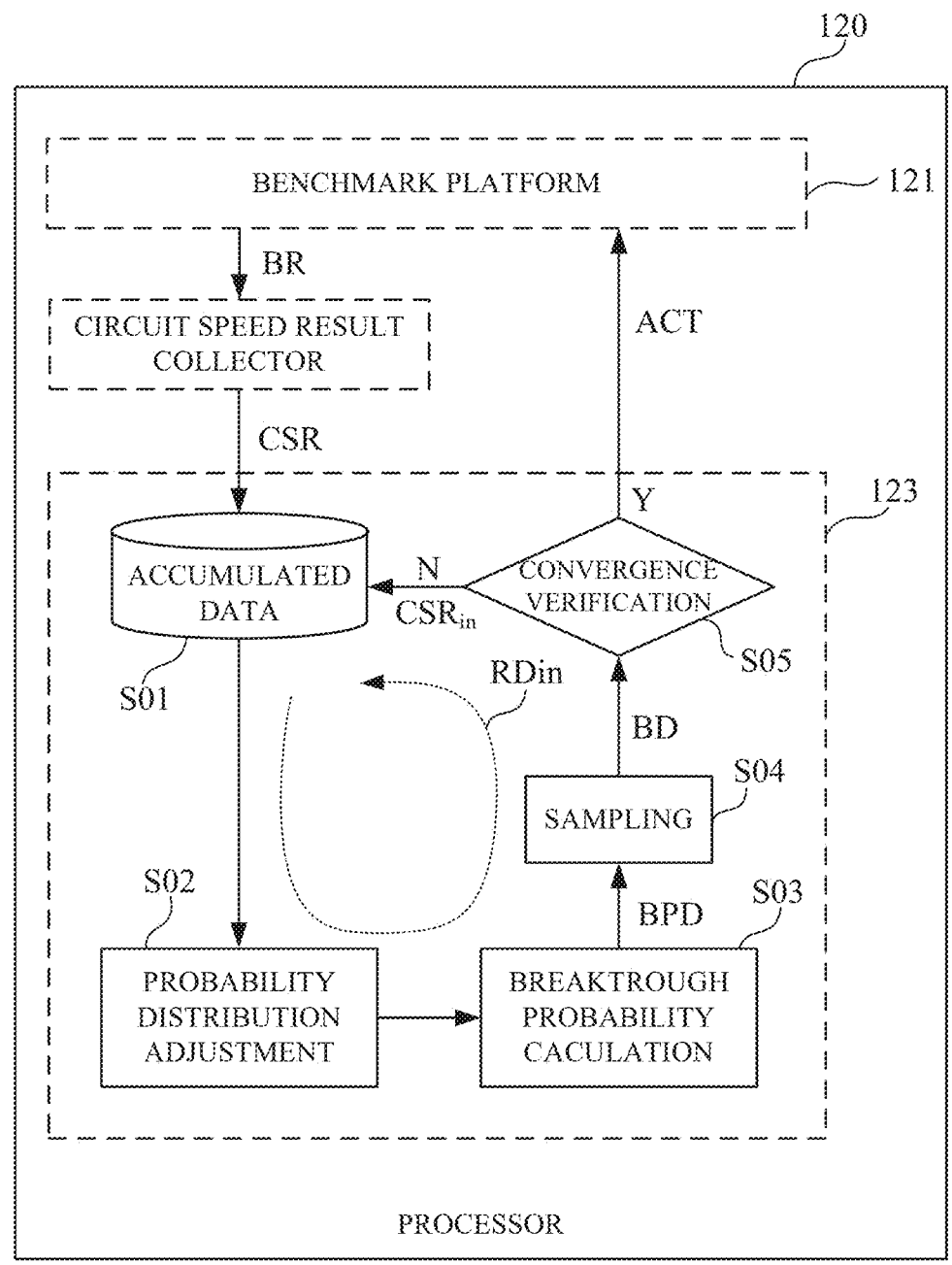
FIG. 2 is a schematic diagram of a processor of the system in FIG. 1 in accordance with some embodiments.

Reference is further made to FIG. 2, which is a schematic diagram of the processor 120 of the system 100 in FIG. 1 in accordance with some embodiments. With respect to the embodiments of FIG. 1, like elements in FIG. 2 are designated with the same reference numbers for ease of understanding.

As illustratively shown in FIG. 1 and FIG. 2, the EDA tool (i.e., the benchmark platform 121) in some embodiments is configured to perform an emulation process to verify the target circuit 143 and estimate performances of the target circuit 143 in at least one emulation round under a given set of constraints $C_1, C_2 \ldots C_n$. In some embodiments, n is a positive integer. In response to that each emulation round is completed, the benchmark platform 121 will generate a benchmark result BR of the target circuit 143. The constraints $C_1, C_2 \ldots C_n$ describe conditions or parameters to emulate the target circuit 143. In some embodiments, the constraints $C_1, C_2 \ldots C_n$ can include timing constraints, such as CLK_PER (clock period or cycle time), FMAX (maximum clocking frequency), TSU (setup time) or TCO (clock-to-output time), and some other constraints, such as bit-width, trace-width or system voltage levels. Each of the constraints $C_1, C_2 \ldots C_n$ can be configured at one of candidate constraint configurations.

In some embodiments, the constraint $C_1$, for example, can be the CLK_PER constraint which describes a time gap between rising edges of a repetitive clock signal. The constraint $C_1$ (CLK_PER) can be configured at different candidate constraint configurations between different emulation rounds performed by the benchmark platform 121. During these emulation rounds, the benchmark results BR of the target circuit 143 can be estimated under different candidate constraint configurations, so as to find out an optimized constraint configurations (from the candidate constraint configurations) of the constraint $C_1$ (CLK_PER) related to the target circuit 143.

As illustratively shown in FIG. 1 and FIG. 2, the circuit speed result collector 122 is configured to receive the benchmark result BR under a given set of the constraints $C_1, C_2 \ldots C_n$ and collect the circuit speed result CSR extracted from the benchmark result BR. In some embodiments, the benchmark result BR may include the circuit speed result CSR and a design rule check (DRC) result.

As illustratively shown in FIG. 1, it is assumed that there are "t" emulation rounds already performed by the benchmark platform 121 to the target circuit 143, and correspondingly circuit speed results $CSR_1, CSR_2 \ldots CSR_t$ are already collected by the circuit speed result collector 122. In some embodiments, t is a positive integer. These results $CSR_1, CSR_2 \ldots CSR_t$ can be accumulated and stored in the circuit speed result library 142. In some embodiments, each of the circuit speed result $CSR_1, CSR_2 \ldots CSR_t$ describes an operational frequency of the target circuit 143 in one of these "t" emulation rounds.

Figure 3:
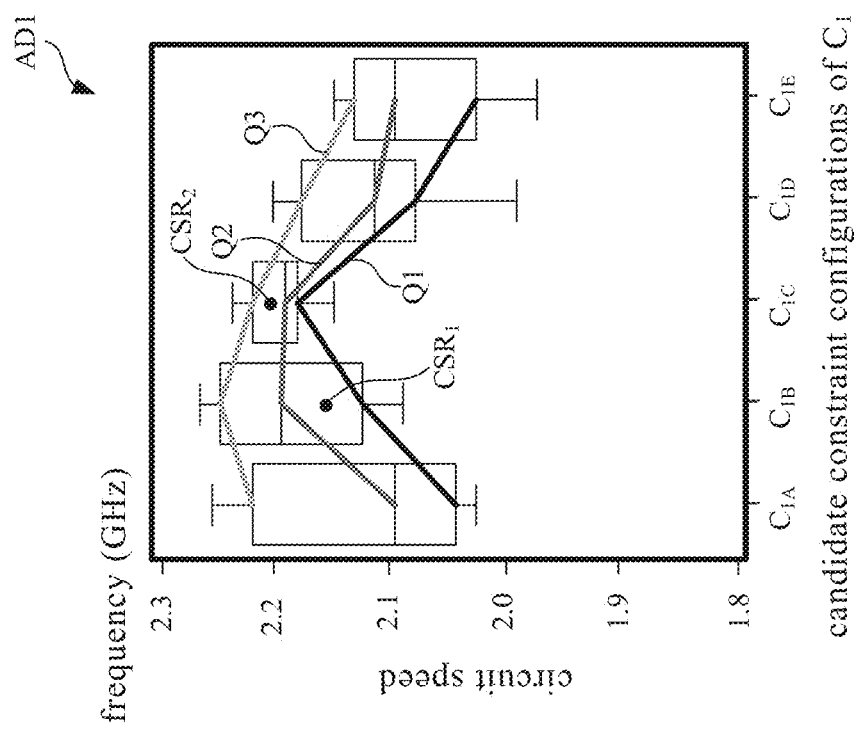
FIG. 3 is an exemplary statistical diagram illustrating an accumulated data of the circuit speed results corresponding to different candidate constraint configurations of a constraint in accordance with some embodiments.

Reference is further made to FIG. 3, which is an exemplary statistical diagram illustrating an accumulated data AD1 of the circuit speed results in the circuit speed result library 142 corresponding to different candidate constraint configurations $C_{1A} \sim C_{1E}$ of the constraint $C_1$ in accordance with some embodiments. With respect to the embodiments of FIG. 1 and FIG. 2, like elements in FIG. 3 are designated with the same reference numbers for ease of understanding.

As shown in FIG. 3, the accumulated data AD1 of the circuit speed results are demonstrated as three statistical lines Q1, Q2 and Q3. The statistical line Q1 shows a 25 percentile line of the operational frequency measured under different candidate constraint configurations $C_{1A} \sim C_{1E}$ of the constraint $C_1$. The statistical line Q2 shows a 50 percentile line (i.e., the average) of the operational frequency measured under different candidate constraint configurations $C_{1A} \sim C_{1E}$ of the constraint $C_1$. The statistical line Q3 shows a 75 percentile line of the operational frequency measured under different candidate constraint configurations $C_{1A} \sim C_{1E}$ of the constraint $C_1$.

As illustratively shown in FIG. 1 and FIG. 3, for example, the circuit speed result $CSR_1$ describes an operational frequency of the target circuit 143 under a condition that the constraint $C_1$ (CLK_PER) is set at the candidate constraint configurations $C_{1B}$, and the circuit speed result $CSR_2$ describes another operational frequency of the target circuit 143 under a condition that the constraint $C_1$ (CLK_PER) is set at another candidate constraint configurations $C_{1C}$. The candidate constraint configurations $C_{1A} \sim C_{1E}$ are different from each other. For example, the candidate constraint configurations $C_{1A} \sim C_{1E}$ of the constraint $C_1$ be in a range between about 0.30 nanoseconds and about 0.42 nanoseconds. In general, the circuit speed results $CSR_1, CSR_2 \ldots CSR_t$ will be different from time to time under different candidate constraint configurations $C_{1A} \sim C_{1E}$ of the constraint $C_1$, and also the circuit speed result $CSR_1, CSR_2 \ldots CSR_t$ are further affected by other constraints $C_2 \sim C_n$ and some random vectors in each of the "t" emulation rounds. These circuit speed results $CSR_1, CSR_2 \ldots CSR_t$ in previous emulation rounds will be collected by the circuit speed result collector 122 and provided to the agent 123, and these circuit speed results $CSR_1, CSR_2 \ldots CSR_t$ in previous emulation rounds are stored as the accumulated data AD1 as shown in FIG. 3.

In aforesaid embodiments, five candidate constraint configurations $C_{1A} \sim C_{1E}$ of the constraint $C_1$ are given for example. The number of the candidate constraint configurations $C_{1A} \sim C_{1E}$ in FIG. 3 is given for illustrative purposes. Various numbers of the candidate constraint configurations $C_{1A} \sim C_{1E}$ are within the contemplated scope of the present disclosure. In practical applications, there can be more than five candidate constraint configurations corresponding to the constraint $C_1$ to cover a wider possible range of the constraint $C_1$ (by having more candidate constraint configurations between wider boundaries) or to increase a preciseness of the circuit speed results the emulation rounds (by having a higher density of candidate constraint configurations within the same boundaries).

In other words, the circuit speed results $CSR_1 \sim CSR_t$ can be regarded as existed circuit speed results related to previously performed emulation rounds. There will be a maximum speed result among the existed circuit speed results $CSR_1 \sim CSR_t$. For example, among all of the existed circuit speed results $CSR_1 \sim CSR_t$, the maximal operation frequency of the target circuit 143 is 2.245 GHz as illustratively shown in FIG. 2.

In some embodiments, the agent 123 is configured to select some promising constraint configurations from the candidate constraint configurations $C_{1A} \sim C_{1E}$ with a higher probability to achieve a breakthrough circuit speed, which exceeds the maximum speed result (e.g., 2.245 GHz) among the existed circuit speed results $CSR_1 \sim CSR_t$.

Based on these accumulated circuit speed results $CSR_1 \sim CSR_t$ in the previous emulation rounds, the agent 123 will suggest a budget distribution BD among one or more candidate constraint configurations $C_{1A} \sim C_{1E}$ to the benchmark platform 121. The benchmark platform 121 will perform benchmark runs in the following emulation round, i.e., the "t+1" emulation round, according to the budget distribution BD.

For example, the budget distribution BD with total "5" budget counts may include "2" budget counts for the candidate constraint configuration $C_{1A}$, another "2" budget counts for the candidate constraint configuration $C_{1C}$, and still another "1" budget count for the candidate constraint configuration $C_{1E}$. In the "t+1" emulation round, the benchmark platform 121 will perform two benchmark runs with the candidate constraint configurations $C_{1A}$, another two benchmark runs with the candidate constraint configurations $C_{1C}$ and one benchmark run with the candidate constraint configurations $C_{1E}$.

As illustratively shown in FIG. 1 and FIG. 2, after the budget distribution BD is determined by the agent 123, the agent 123 is able to send an action ensemble signal ACT, which includes information of the confirmed budget distribution BD, to the benchmark platform 121. The benchmark platform 121 will perform the benchmark runs in the "t+1" emulation round according to the action ensemble signal ACT and the corresponding budget distribution BD.

Usually, it takes a long time to complete the "t+1" emulation round by the benchmark platform 121. For example, the target circuit 143 may include thousands or even more components in an advance circuit application, and it take about hours, days or even weeks to complete the "t+1" emulation round. Therefore, it will be not time efficient to run the "t+1" emulation round according to the budget distribution BD without confidences in a try-and-error approach.

It is noticed that, as illustratively shown in FIG. 2, the agent 123 can perform one or more inner-agent rounds RDin before sending the action ensemble signal ACT to the benchmark platform 121. In each one of the inner-agent rounds RDin, the agent 123 will generate one budget distribution BD. In some embodiments, the agent 123 can verify a convergence of selected constraint configurations in the budget distribution BD determined during the inner-agent rounds RDin. In response to that the selected constraint configurations in the budget distribution BD is not converged, such as the selected constraint configurations in the budget distribution BD are widely distributed over several candidate constraint configurations $C_{1A}$~$C_{1E}$, the agent 123 will perform another inner-agent round RDin.

In some embodiments, the agent 123 will send the action ensemble signal ACT and the corresponding budget distribution BD to the benchmark platform 121 in response to that the budget distribution BD is converged, such as the selected constraint configurations in the budget distribution BD are concentrated within a small group among the candidate constraint configurations $C_{1A}$~$C_{1E}$. Further details about the inner-agent rounds RDin in the agent 123 will be explained in following paragraphs.

As illustratively shown in FIG. 2, the agent 123 performs operations S01~S05 in the inner-agent rounds RDin recursively and determining the budget distribution BD in an iteration manner. Firstly, the operation S01 will be performed, by the agent 123, to accumulate the circuit speed results $CSR_1$~$CSR_t$ of the target circuit 143 under different candidate constraint configurations in the previous "t" emulation rounds. These circuit speed results $CSR_1$~$CSR_t$ can be accumulated as the accumulated data AD1 shown in FIG. 2 and FIG. 3.

In some embodiments, the accumulated data AD1 can be stored in the circuit speed result library 142 of the non-transitory computer readable storage medium 140, which can be accessed by the agent 123. In some embodiments, the accumulated data AD1 can be loaded into a cache or a memory, which can be accessed by the agent 123.

In some embodiments, the operation S02 will be performed, by the agent 123, to adjust a probability distribution of the accumulated data AD1. For example, the accumulated data AD1 include the circuit speed results $CSR_1$~$CSR_t$ corresponding to different emulation rounds. These circuit speed results $CSR_1$~$CSR_t$ will be given different timing weights in following sampling (i.e., the operation S04). For the older circuit speed results $CSR_1$ in the earlier round, the circuit speed results $CSR_1$ will be given a relatively lower weight. For the newer circuit speed results CSR in the later round, the circuit speed results $CSR_t$ will be given a relatively higher weight in following sampling (i.e., the operation S04).

Because a benchmark environment of the target circuit 143 may varies from time to time, such as a version of the EDA tool is updated or manufacturing parameters of the target circuit 143 are modified, this time-weighted augmentation in the operation S02 is beneficial to adapt dynamic changes of the benchmark environment.

After the time-weighted augmentation of the circuit speed results $CSR_1$~$CSR_t$, the operation S03 will be performed, by the agent 123, to determine breakthrough probability distributions BPD relative to each of the candidate constraint configurations $C_{1A}$~$C_{1E}$ according to the time-weighted circuit speed results $CSR_1$~$CSR_t$.

Figure 4:
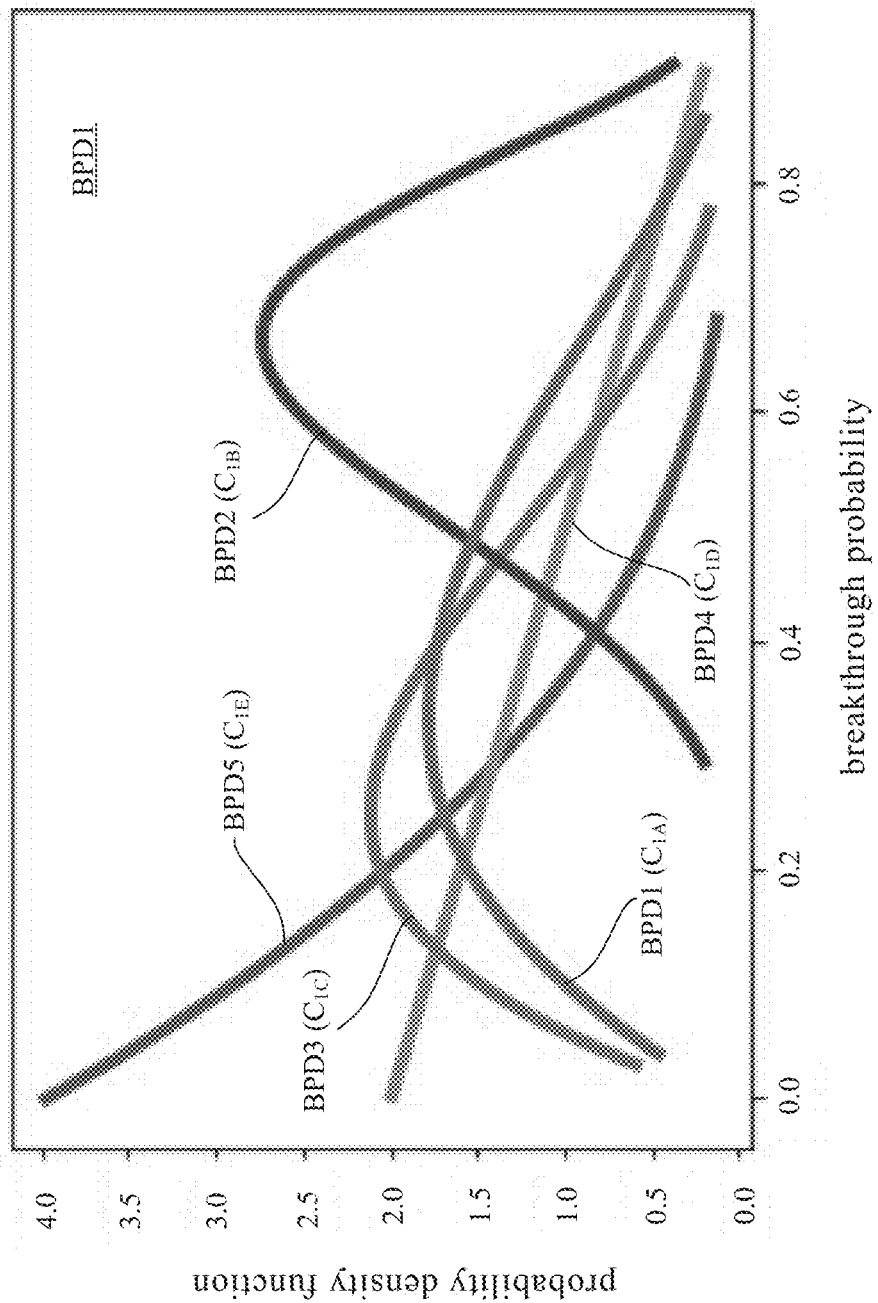
FIG. 4 is an exemplary statistical diagram illustrating breakthrough probability distributions relative to each of the candidate constraint configurations in accordance with some embodiments.

Reference is further made to FIG. 4, which is an exemplary statistical diagram illustrating breakthrough probability distributions BPD relative to each of the candidate constraint configurations $C_{1A}$~$C_{1E}$ in accordance with some embodiments. With respect to the embodiments of FIG. 1 to FIG. 3, like elements in FIG. 4 are designated with the same reference numbers for ease of understanding.

In some embodiments shown in FIG. 4, the breakthrough probability distribution BPD1 of the candidate constraint configuration $C_{1A}$ is represented by a probability density function of breakthrough probability according to the existed circuit speed results $CSR_1$~$CSR_t$ under the same candidate constraint configuration $C_{1A}$.

In some embodiments, for a smaller sized accumulated data AD1 (such as the accumulated data AD1 has information in three emulation rounds or less), probability density function of the breakthrough probability distribution BPD1 can be calculated by a probability density function for the Beta distribution algorithm as $B(\alpha,\beta)$. In some embodiments, for a larger sized accumulated data AD1 (such as the accumulated data AD1 has information in more than three emulation rounds), probability density function of the breakthrough probability distribution BPD1 can be calculated by a probability density function for the Gaussian distribution algorithm as $N(\mu,\sigma^2)$. In some embodiments, for an accumulated data AD1 with cross-interactions between at least two constraints (e.g., considering constraints $C_1$ and $C_2$ shown in FIG. 1 at the same time), probability density function of the breakthrough probability distribution BPD1 can be calculated by a probability density function for the Gaussian process distribution algorithm as $N[\mu(x), K(x,x')]$.

Similarly, breakthrough probability distribution BPD2 of the candidate constraint configurations $C_{1B}$ is represented by a probability density function of breakthrough probability according to the existed circuit speed results $CSR_1$~$CSR_t$ under the same candidate constraint configuration $C_{1B}$. Similarly, breakthrough probability distributions BPD3~BPD5 of the candidate constraint configurations $C_{1C}$~$C_{1E}$ is represented by a probability density function of breakthrough probability according to the existed circuit speed results $CSR_1$~$CSR_t$ under the corresponding candidate constraint configurations $C_{1C}$~$C_{1E}$.

The operation S04 will be performed, by the agent 123, to execute a couple of sampling runs relative to each of the breakthrough probability distributions BPD1~BPD5, so as to generate a budget distribution BD. In some embodiments, the sampling performed in the operation S04 can be a Thompson Sampling onto the breakthrough probability distributions BPD1~BPD5. The breakthrough probability distributions BPD1~BPD5 with higher densities will be more likely to be selected in the Thompson Sampling.

Figure 5A:
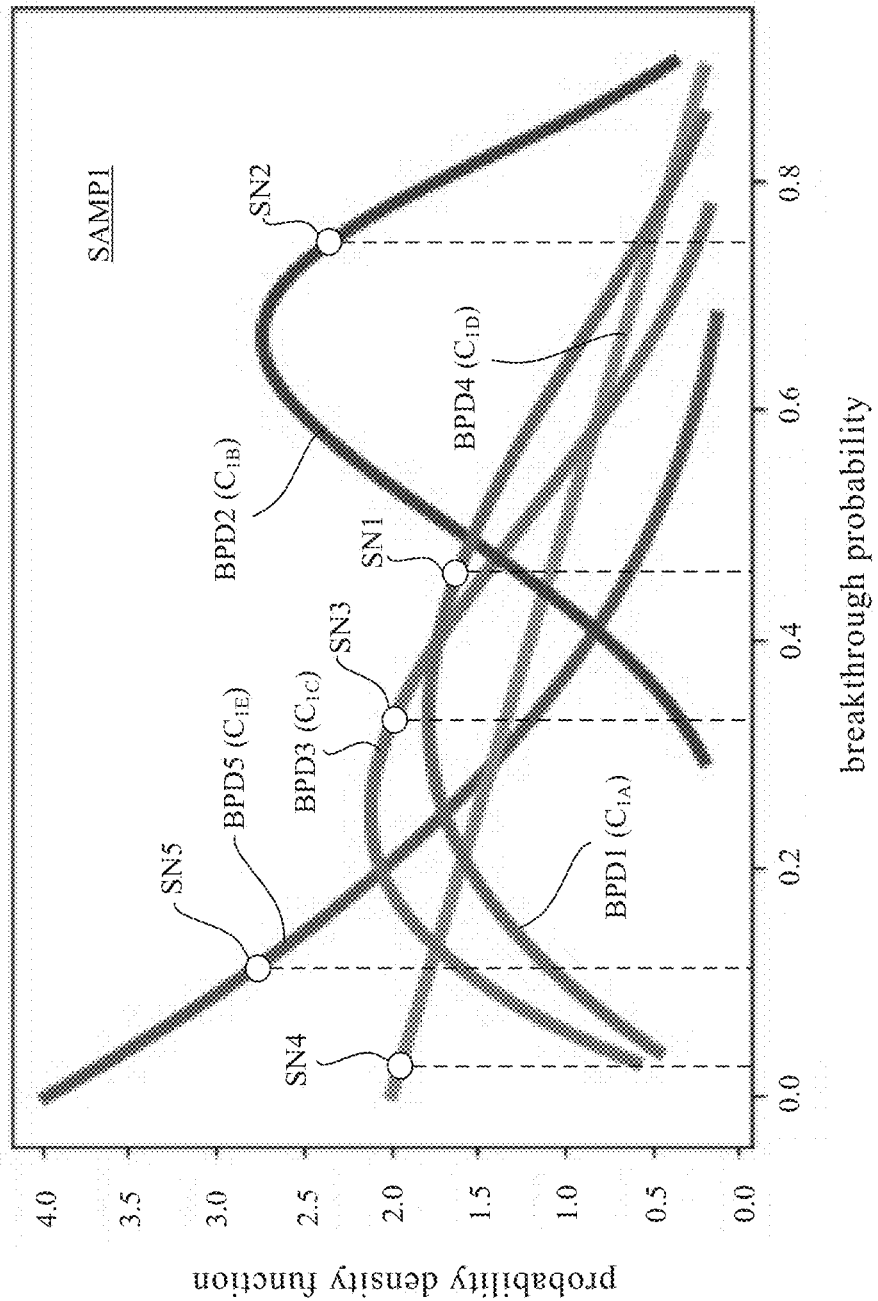
FIG. 5A is an exemplary statistical diagram illustrating sampled nodes on each of breakthrough probability distributions in one sampling result in an operation in FIG. 4.

Reference is further made to FIG. 5A, which is an exemplary statistical diagram illustrating sampled nodes on each of breakthrough probability distributions BPD1~BPD5 in one sampling result SAMP1 of the operation S04. As shown in FIG. 5A, the sampling result SAMP1 includes five sampled nodes SN1~SN5 on five breakthrough probability distributions BPD1~BPD5. Each of the sampled nodes SN1~SN5 is randomly sampled respectively according to the probability density functions of the breakthrough probability distributions BPD1~BPD5. Each of the sampled nodes SN1~SN5 maps to a breakthrough probability of the corresponding candidate constraint configurations $C_{1A}$~$C_{1E}$. For example, as illustrated in FIG. 5A, the sampled node SN1 maps to the breakthrough probability of "0.42"; the sampled node SN2 maps to the breakthrough probability of "0.75"; the sampled node SN3 maps to the breakthrough probability of "0.34"; the sampled node SN4 maps to the breakthrough probability of "0.03"; and, the sampled node SN5 maps to the breakthrough probability of "0.12".

Figure 5B:
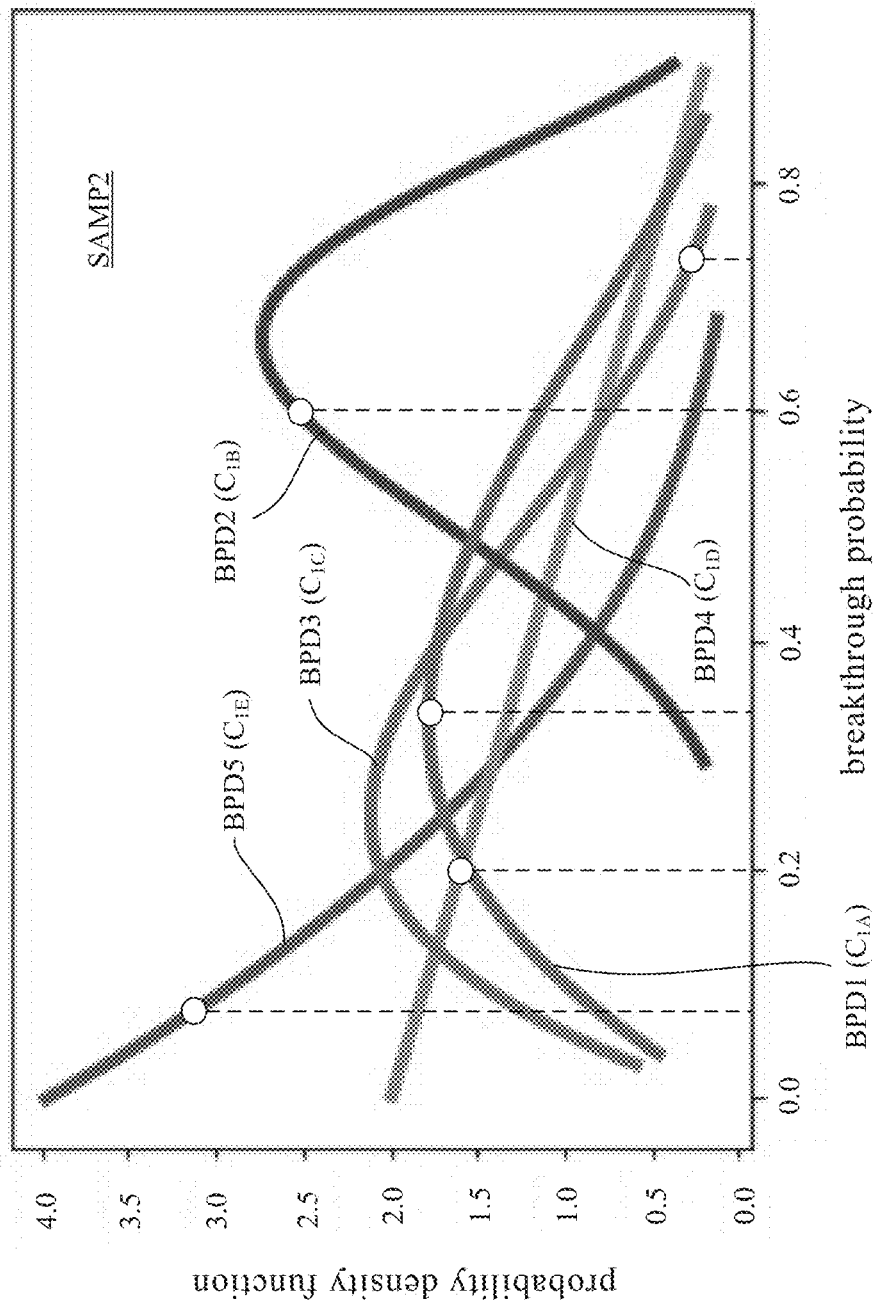
FIG. 5B is another exemplary statistical diagram illustrating sampled nodes on each of breakthrough probability distributions in another sampling result in an operation in FIG. 4.

Reference is further made to FIG. 5B, which is another exemplary statistical diagram illustrating sampled nodes on each of breakthrough probability distributions BPD1~BPD5 in one sampling result SAMP2 of the operation S04. As shown in FIG. 5B, the sampling result SAMP2 includes another five sampled nodes SN1~SN5 on five breakthrough probability distributions BPD1~BPD5. Each of the sampled nodes SN1~SN5 in the sampling result SAMP2 is randomly sampled respectively according to the probability density functions of the breakthrough probability distributions BPD1~BPD5. Due to the random characteristics of the sampling, the five sampled nodes SN1~SN5 sampled in the sampling result SAMP2 in FIG. 5B by Thompson Sampling will be not be the same as the five sampled nodes SN1~SN5 in the sampling result SAMP1 in FIG. 5A. The sampling results SAMP1 and SAMP2 generated by Thompson Sampling will have different breakthrough probabilities on the candidate constraint configurations $C_{1A}$~$C_{1E}$ in two runs of sampling.

Similar to embodiments in FIG. 5A and FIG. 5B, the operation S04 can include more runs of sampling in one inner-agent round RDin. In some embodiments, the operation S04 includes total 5 runs of sampling in one inner-agent round RDin. The number of 5 runs of sampling in one inner-agent round RDin is given for illustrative purposes. Various numbers of the runs of sampling in one inner-agent round RDin are within the contemplated scope of the present disclosure.

Reference is further made to FIG. 6 and FIG. 7. FIG. 6 is a schematic diagram illustrating relationships between breakthrough probabilities under the candidate constraint configurations $C_{1A}$~$C_{1E}$ in aforesaid five runs of sampling. FIG. 7 is a schematic diagram illustrating a combination of the candidate constraint configurations in a budget distribution BD1 determined by the operation S04 according to the sampling results SAMP1~SAMP5 in FIG. 6. With respect to the embodiments of FIG. 1 to FIG. 5B, like elements in FIG. 6 and FIG. 7 are designated with the same reference numbers for ease of understanding.

As illustratively shown in FIG. 6, in the sampling result SAMP1, the candidate constraint configuration $C_{1B}$ is sampled to have the highest breakthrough probability "0.75" among the breakthrough probabilities 0.42, 0.75, 0.34, 0.03 and 0.12 of the candidate constraint configurations $C_{1A}$~$C_{1E}$, such that the candidate constraint configuration $C_{1B}$ will be selected into the budget distribution according to the sampling result SAMP1. In the sampling result SAMP2, the candidate constraint configuration $C_{1C}$ is sampled to have the highest breakthrough probability "0.74" among the breakthrough probabilities 0.36, 0.60, 0.74, 0.20 and 0.08 of the candidate constraint configurations $C_{1A}$~$C_{1E}$, such that the candidate constraint configuration $C_{1C}$ will be selected into the budget distribution according to the sampling result SAMP2.

Similarly, the candidate constraint configuration $C_{1A}$ will be selected into the budget distribution according to the sampling result SAMP3; the candidate constraint configuration $C_{1B}$ will be selected into the budget distribution according to the sampling result SAMP4; and the candidate constraint configuration $C_{1B}$ will be selected into the budget distribution according to the sampling result SAMP5.

Based aforesaid selected constraint configurations in these sampling results SAMP1~SAMP5 shown in FIG. 6, the budget distribution BD1 in FIG. 7 includes selected three of the candidate constraint configurations $C_{1A}$, $C_{1B}$ and $C_{1C}$ and corresponding budget counts "1", "3" and "1" of the candidate constraint configurations $C_{1A}$, $C_{1B}$ and $C_{1C}$. As shown in the budget distribution BD1, based on the current accumulated data AD1, the agent 123 suggests that the selected candidate configuration $C_{1B}$ has the highest probability to exceed the maximum speed result in previous emulation rounds, and the selected candidate constraint configurations $C_{1A}$ and $C_{1C}$ also has probabilities to exceed the maximum speed result in previous emulation rounds. The agent 123 suggests investing the most budgets into the selected candidate constraint configuration $C_{1B}$, and also sharing some budgets into the candidate constraint configurations $C_{1A}$ and $C_{1C}$.

As shown in FIG. 7, the budget counts of the budget distribution BD1 are not equally distributed (e.g., 1, 1, 1, 1, 1 for each of $C_{1A}$~$C_{1E}$) to all of the five candidate constraint configurations $C_{1A}$~$C_{1E}$. In other words, the budget counts are not evenly distributed as one budget for each one of the candidate constraint configurations $C_{1A}$~$C_{1E}$. The budget counts of the budget distribution BD1 are distributed by the agent 123 to the selected candidate constraint configurations which are promising to break through the maximum speed result. For candidate constraint configurations with lower probabilities, the agent 123 will assign lower budget counts or avoid assigning any budget count. Based on aforesaid embodiments, the budget distribution BD1 will have a better efficiency in searching the optimized constraint configurations for the constraint $C_1$.

In some embodiments, compared to use an equally distributed budget distribution, the system 100 can reduce a consumption time by about 50% in searching for the optimized constraint $C_1$ and to complete the benchmark emulation rounds by assigning the refined budget distribution BD1.

In some embodiments, the runs of sampling in one inner-agent round RDin in the operation S04 is configured to match the "5" budget counts in the budget distribution BD1. In other embodiments, if the budget distribution BD1 includes more or less budget counts, the runs of sampling in one inner-agent round RDin can be adjusted accordingly. For example, if the budget distribution BD1 includes 7 budget counts, the operation S04 can perform 7 runs of sampling in one inner-agent round RDin.

Based on aforesaid embodiments, the agent 123 is able to suggest the budget distribution BD1 among the candidate constraint configurations $C_{1A}$~$C_{1E}$ according to the accumulated data AD1 without a manipulation input from a human (e.g., an engineer or a circuit designer). In other words, the system 100 is able to explore best candidates of the constraint $C_1$ to have a faster circuit speed without human effort. Since no human effort is required, the system 100 is able to broaden a searching range of the candidate constraint configurations of the constraint $C_1$. For example, if the engineer normally tries to set the constraint $C_1$ (e.g., CLK_PER) between about 0.33 nanosecond and about 0.38 nanosecond, in some embodiments, the system 100 is able to search the constraint $C_1$ between about 0.29 nanosecond and about 0.42 nanosecond. Searching the constraint $C_1$ in a broaden range may provide additional opportunity to break a speed ceiling of the target circuit 143.

As illustratively shown in FIG. 2 and FIG. 7, after the budget distribution BD1 is determined, the operation S05 will be performed, by the agent 123, to determine a convergence of the budget distribution BD1. In other words, the operation S05 is utilized to verify whether a result of the selected constraint configurations in the budget distribution BD1 (e.g., 1, 3, 1 on $C_{1A}$, $C_{1B}$, $C_{1C}$ in the embodiments in FIG. 7) is converged or not.

In some embodiments, a convergence the budget distribution BD1 in the inner-agent round RDin is estimated according to vector distances existed between the selected constraint configurations in the budget distribution BD1. If the selected constraint configurations in the budget distribution BD1 are distributed to a big group among the candidate constraint configurations $C_{1A}$~$C_{1E}$ with a low density, the vector distances between the selected constraint configurations in the budget distribution BD1 will be longer, such that the agent 123 will determine that the budget distribution BD1 is not converged. In this case, if the budget distribution BD1 is not converged, it indicates that the agent 123 does not have enough confidence in the current result of the budget distribution BD1. In response to the budget distribution BD1 is determined to be not converged yet, the agent 123 will return to S01 to enter another inner-agent round RDin. The agent 123 will repeat the necessary amounts of the inner-agent rounds RDin until an outcome of budget distribution BD is converged.

On the other hand, if the selected constraint configurations in the budget distribution BD1 are highly concentrated within a small group among the candidate constraint configurations $C_{1A}$~$C_{1E}$, the vector distances between the selected constraint configurations in the budget distribution BD1 will be shorter, the agent 123 will determine that the budget distribution BD1 is converged. In this case, if the budget distribution BD1 is converged, it indicates that the agent 123 has enough confidence in the current result of the budget distribution BD, and the agent 123 will send the budget distribution BD1 to the benchmark platform 121. In this case, the benchmark platform 121 will utilizes the selected constraint configurations in the budget distribution BD1 for implementing the target circuit 143 and generating an updated circuit speed result CSR of the target circuit 143 in the "t+1" emulation round.

As mentioned above, it takes a long time (hours, days or even weeks) to complete the "t+1" emulation round by the benchmark platform 121. It will be not time efficient to run the "t+1" emulation round according to the budget distribution BD1, if the budget distribution BD1 is not converged. By utilizing the inner-agent rounds RDin, it can avoid to send an unsure budget distribution to the benchmark platform 121.

In some embodiments, the operation S05 is performed based on a Markov Chain Monte Carlo (MCMC) model. The Markov Chain Monte Carlo (MCMC) model is able to do Bayesian emulation for estimating a long-term reward prediction corresponding to the budget distribution BD1. The MCMC model treats the circuit speed results $CSR_0$~$CSR_t$ in the accumulated data AD1 as training inputs and treats the budget distribution BD1 as actions. The agents 123 utilizes the MCMC model to estimate a long-term reward by formulating the circuit speed results $CSR_0$~$CSR_t$ as a series of successes and failures (in breaking through the maximum circuit speed). When circuit speed results in a new emulation round exceed a maximum circuit speed from previous emulation rounds, a reward will be given to the agents 123.

Based on the embodiments shown in FIG. 2 and FIG. 7, for demonstrational purpose, it is assumed that the budget distribution BD1 is determined to be not converged in the operation S05 because the selected constraint configurations in the budget distribution BD1 are not concentrated enough. In some embodiments, the agent 123 is configured to generate inner circuit speed results according to the budget distribution BD1. These inner circuit speed results can be utilized to simulate new EDA results from the benchmark platform 121 without really performing the EDA emulation on the benchmark platform 121. In some embodiments, the inner circuit speed results will be combined with the existed circuit speed results $CSR_0$~$CSR_t$ in the accumulated data AD1 in FIG. 3.

Figure 8:
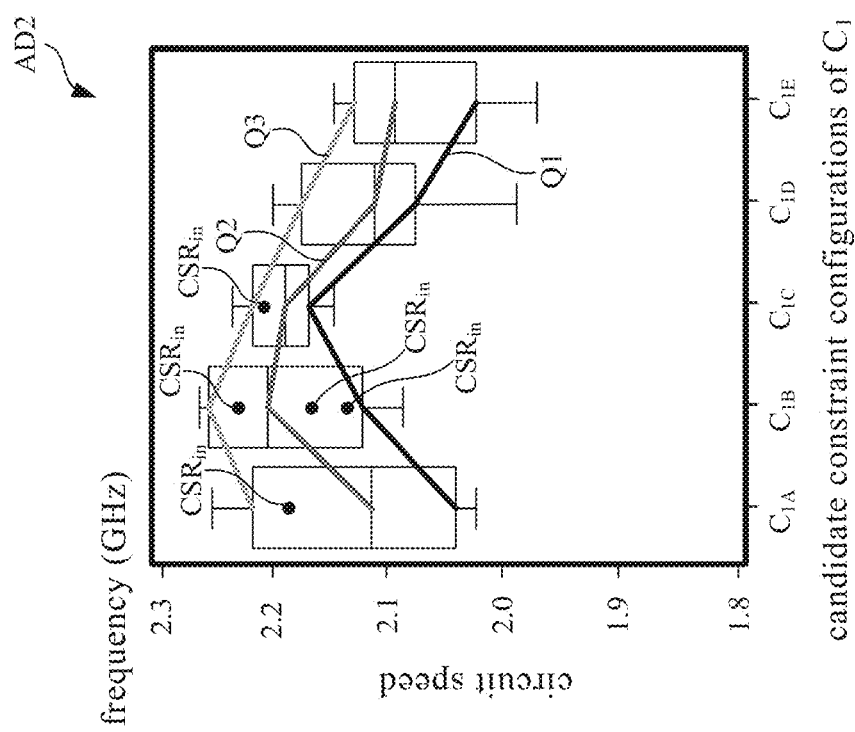
FIG. 8 is an exemplary statistical diagram illustrating an updated accumulated data including the circuit speed results and new inner circuit speed results in accordance with some embodiments.

Reference is further made to FIG. 8, which is an exemplary statistical diagram illustrating an updated accumulated data AD2 including the circuit speed results in the circuit speed result library 142 and new inner circuit speed results in accordance with some embodiments. As illustratively shown in FIG. 2, FIG. 7 and FIG. 8, total five inner circuit speed results $CSR_{in}$ are generated according to the budget distribution BD1. Among these five inner circuit speed results $CSR_{in}$, one inner circuit speed result $CSR_{in}$ is added under candidate constraint configuration $C_{1A}$; three inner circuit speed results $CSR_{in}$ is added under candidate constraint configuration Cis; and, one inner circuit speed result $CSR_{in}$ is added under candidate constraint configuration $C_{1C}$. In the operation S01 of this new inner-agent round RDin, these inner circuit speed results $CSR_{in}$ are combined by the agent 123 with the existed circuit speed results $CSR_1$, $CSR_2$ ... $CSR_t$ in the accumulated data AD1 shown in FIG. 3, so as to form the updated accumulated data AD2 shown in FIG. 8.

In some embodiments, the inner circuit speed results $CSR_{in}$ under one of candidate constraint configurations $C_{1A}$~$C_{1E}$ can be duplicated or synthesized from the existed circuit speed results $CSR_1$, $CSR_2$ ... $CSR_t$ under the corresponding candidate constraint configurations $C_{1A}$~$C_{1E}$. For example, the inner circuit speed result $CSR_{in}$ added under the candidate constraint configuration $C_{1C}$ shown in FIG. 8 can be duplicated or synthesized from the existed circuit speed results $CSR_2$ under the corresponding candidate constraint configurations $C_{1C}$ shown in FIG. 3.

As shown in FIG. 2 and FIG. 8, the updated accumulated data AD2 includes these inner circuit speed result $CSR_{in}$ in addition to the existed circuit speed results $CSR_1$, $CSR_2$ ... $CSR_t$, such that the statistical lines Q1, Q2 and Q3 of the updated accumulated data AD2 in FIG. 8 will be different from the statistical lines Q1, Q2 and Q3 of the accumulated data AD1 shown in FIG. 3.

In some embodiments, the operation S02 will be performed, by the agent 123, to adjust a probability distribution (e.g., time-weighted augmentation) of the accumulated data AD2. After the time-weighted augmentation of the circuit speed results $CSR_1$~$CSR_r$, the operation S03 will be performed, by the agent 123, to determine breakthrough probability distributions BPD relative to each of the candidate constraint configurations $C_{1A}$~$C_{1E}$ according to the time-weighted circuit speed results $CSR_1$~$CSR_r$.

Figure 9:
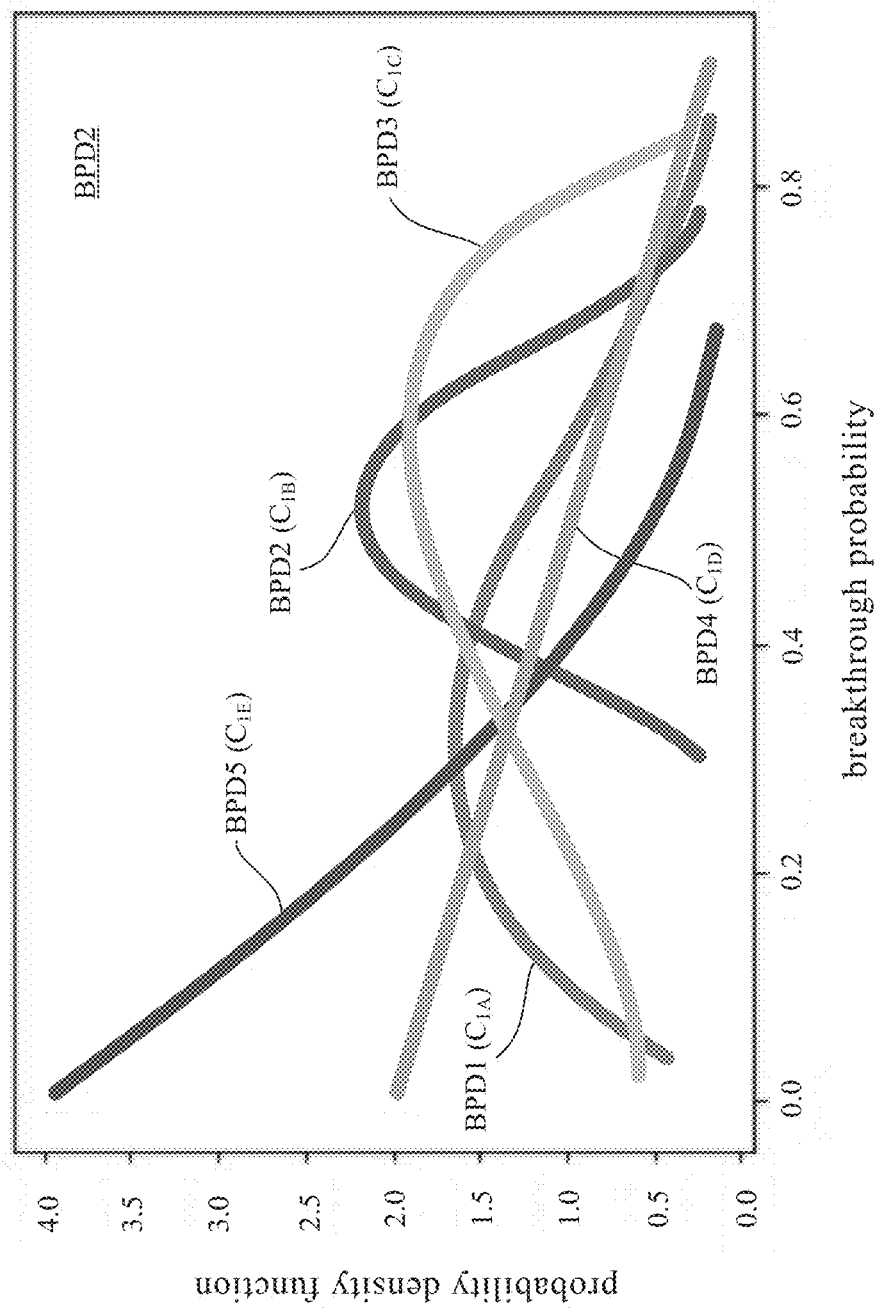
FIG. 9 is an exemplary statistical diagram illustrating breakthrough probability distributions relative to each of the candidate constraint configurations based on the accumulated data in FIG. 8 in accordance with some embodiments.

Reference is further made to FIG. 9, which is an exemplary statistical diagram illustrating breakthrough probability distributions BPD relative to each of the candidate constraint configurations $C_{1A}$~$C_{1E}$ based on the accumulated data AD2 in FIG. 8 in accordance with some embodiments. With respect to the embodiments of FIG. 1 to FIG. 7, like elements in FIG. 8 are designated with the same reference numbers for ease of understanding. Since the inner circuit speed results $CSR_{in}$ are added into the accumulated data AD2, the breakthrough probability distributions BPD shown in FIG. 9 will be different from the breakthrough probability distributions BPD (without including the inner circuit speed results $CSR_{in}$) shown in FIG. 4.

In some embodiments shown in FIG. 9, the breakthrough probability distributions BPD1~BPD5 of the candidate constraint configurations $C_{1A}$~$C_{1E}$ is represented by probability density functions of breakthrough probability according to the existed circuit speed results $CSR_1$~$CSR_r$.

The operation S04 will be performed, by the agent 123, to execute another five runs of sampling relative to each of the breakthrough probability distributions BPD1~BPD5 in FIG. 9, so as to select constraint configurations from the candidate constraint configurations $C_{1A}$~$C_{1E}$. Accordingly, the agent 123 generates another budget distribution according to the select constraint configurations in this inner-agent round RDin.

Figures 10, 11:
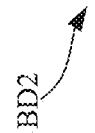
FIG. 10 is a schematic diagram illustrating relationships between breakthrough probabilities under the candidate constraint configurations in five runs of sampling.
FIG. 11 is a schematic diagram illustrating a combination of the candidate constraint configurations in a budget distribution determined according to the sampling results in FIG. 10.

Reference is further made to FIG. 10 and FIG. 11. FIG. 10 is a schematic diagram illustrating relationships between breakthrough probabilities under the candidate constraint configurations $C_{1A}$~$C_{1E}$ in five runs of sampling. FIG. 11 is a schematic diagram illustrating a combination of the candidate constraint configurations in a budget distribution BD2 determined by the operation S04 according to the sampling results SAMP1~SAMP5 in FIG. 10. With respect to the embodiments of FIG. 1 to FIG. 9, like elements in FIG. 10 and FIG. 11 are designated with the same reference numbers for ease of understanding.

Since the breakthrough probability distributions BPD shown are updated, the results of sampling SAMP1~SAMP5 as illustratively shown in FIG. 10 will be different from the previous inner-agent round RDin. As illustratively shown in FIG. 11, the budget distribution BD2 can be determined according to the results of sampling SAMP1~SAMP5 as illustratively shown in FIG. 10. The details about the operations S02 to S04 are similar to the embodiments discussed in FIG. 3 to FIG. 7, and not to be repeated again.

As illustratively shown in FIG. 2 and FIG. 11, after the budget distribution BD2 is determined, the operation S05 will be performed, by the agent 123, to determine a convergence of the budget distribution BD2. In other words, the operation S05 is utilized to verify whether a result of the selected constraint configurations in the budget distribution BD2 (e.g., 2, 2, 1 on $C_{1B}$, $C_{1C}$, $C_{1D}$ in the embodiments in FIG. 11) is converged or not.

In some embodiments, a convergence of the budget distribution BD2 in the inner-agent round RDin is estimated according to vector distances existed between the selected constraint configurations in the budget distribution BD2. In this case, if the budget distribution BD2 is not converged, it indicates that the agent 123 does not have enough confidence in the current result of the budget distribution BD2. In response to the budget distribution BD2 is determined to be not converged yet, the agent 123 will return to S01 to enter another inner-agent round RDin. The agent 123 will repeat the necessary amounts of the inner-agent rounds RDin until an outcome of budget distribution BD is converged.

On the other hand, if the selected constraint configurations in the budget distribution BD2 are highly concentrated within a small group among the candidate constraint configurations $C_{1A}$~$C_{1E}$, the vector distances between the selected constraint configurations in the budget distribution BD2 will be shorter, the agent 123 will determine that the budget distribution BD2 is converged. In this case, if the budget distribution BD2 is converged, it indicates that the agent 123 has enough confidence in the current result of the budget distribution BD, and the agent 123 will send the budget distribution BD2 to the benchmark platform 121. In this case, the benchmark platform 121 will utilizes the selected constraint configurations in the budget distribution BD2 for implementing the target circuit 143 and generating an updated circuit speed result CSR of the target circuit 143 in the "t+1" emulation round.

Based on the embodiments shown in FIG. 2 and FIG. 11, for demonstrational purpose, it is assumed that the budget distribution BD2 is determined to be not converged in the operation S05 because the selected constraint configurations in the budget distribution BD2 are not concentrated enough.

Reference is further made to FIG. 12, which is a schematic diagram illustrating the budget distributions BD1~BD4 determined in the four recursive inner-agent rounds RDin. As embodiments shown in FIG. 12, the agent 123 performs four inner-agent rounds RDin to generate budget distributions BD1~BD4. During each of the inner-agent rounds RDin, more inner circuit speed results $CSR_{in}$ will be added into the accumulated data to simulate the results from the benchmark platform 121.

As shown in FIG. 12, the budget distribution BD4 generated in the fourth time of the inner-agent round RDin has the selected candidate constraint configurations $C_{1B}$ and $C_{1C}$ with a high density. In some embodiments, the agent 123 will determine the budget distribution BD4 is converged.

In response to the budget distribution BD4 is converged, the agent 123 will send the action ensemble signal ACT to the benchmark platform 121.

In some embodiments, the action ensemble signal ACT includes the converged budget distribution BD4, such that the action ensemble signal ACT will trigger the benchmark platform 121 to invest four budgets into the candidate constraint configuration $C_{1B}$ of the constraint $C_1$ and one budget into the candidate constraint configuration $C_{1C}$ of the constraint $C_1$ in the "t+1" emulation round. The benchmark platform 121 will implement the target circuit 143 according to the converged budget distribution BD4 and generating an updated circuit speed result CSR of the target circuit 143.

After the updated circuit speed result CSR of the target circuit 143 is generated by the benchmark platform 121, the circuit speed result collector 122 will collect the updated circuit speed result CSR, and add the updated circuit speed result CSR into the accumulated data in the agent 123. Therefore, the accumulated data in the agent 123 will dynamically updated in each one of the emulation rounds, such that the system 100 can be an on-line system which interacts with the circuit implementation flow in real-time.

In some other embodiments, the action ensemble signal ACT includes only the converged budget distribution BD4.

In this case, the agent 123 will perform more inner-agent rounds RDin to gather a couple of converged budget distributions (for example, two or three converged budget distributions), and the agent 123 ensembles these converged budget distributions together as the action ensemble signal ACT.

Based on aforesaid embodiments, the processor 120 can perform multiple EDA emulation rounds and even more inner-agent round RDin between two consecutive EDA emulation rounds, so as to find out a best configuration of the constraint $C_1$. In some embodiments, the processor 120 can selects a maximum speed result among all of the circuit speed results in all of the EDA emulation rounds. The processor 120 utilizes the candidate constraint configurations associated with the maximum speed result for implementing the target circuit 143.

In similar manners, the processor 120 is able to find out best configurations of other constraint $C_2$~$C_n$ for implementing the target circuit 143. In other words, the processor 120 is able to search for a best combination of the constraints $C_1$~$C_n$ for implementing the target circuit 143.

As illustratively shown in FIG. 1, the system 100 further includes, in at least some embodiments, photolithography and fabrication tools 160. The photolithography and fabrication tools 160 are coupled with the processor 120 and the non-transitory computer readable storage medium 140.

In some embodiments, the best configurations of other constraint $C_1$~$C_n$ for implementing the target circuit 143 in accordance with one or more of the processes described above with reference to FIG. 1 to FIG. 12 may be transferred to one or more photolithography and fabrication tools 160 to generate a photomask and fabricate the target circuit 143. In some embodiments, because the target circuit 143 can be fabricated with the best configurations of other constraint $C_1$~$C_n$, the product speed of the target circuit 143 can be increased and a chip area of the target circuit 143 can be reduced accordingly.

In some embodiments, a method includes following operations. First circuit speed results of a target circuit under different candidate constraint configurations are accumulated. Breakthrough probability distributions relative to each of the candidate constraint configurations are determined according to the first circuit speed results. First selected constraint configurations are determined from the candidate constraint configurations by sampling the breakthrough probability distributions. A first budget distribution is determined among the first selected constraint configurations. In response to that the first budget distribution is converged, the first selected constraint configurations in the first budget distribution is utilized for implementing the target circuit and generating an updated circuit speed result of the target circuit.

In some embodiments, the method further includes following operations. In response to that the first budget distribution is not converged, inner circuit speed results are generated according to the first budget distribution. The inner circuit speed results are combined with the first circuit speed results as second circuit speed results. The breakthrough probability distributions are updated according to the second circuit speed results. Second selected constraint configurations are determined from the candidate constraint configurations by sampling the breakthrough probability distributions. A second budget distribution is determined among the second selected constraint configurations. A convergence of the second budget distribution is determined. In response to that the second budget distribution is converged, the second selected constraint configurations in the second budget distribution is utilized for implementing the target circuit and generating the updated circuit speed result of the target circuit.

In some embodiments, the circuit speed results are accumulated from at least one emulation round executed by a benchmark platform, and the updated circuit speed results of the target circuit are generated in another emulation round executed by the benchmark platform.

In some embodiments, the benchmark platform comprises an electronic design automation (EDA) tool.

In some embodiments, each of the breakthrough probability distributions describes a distribution of probabilities under one of the constraint configurations to obtain a breakthrough circuit speed result which exceeds all of the first circuit speed results.

In some embodiments, the breakthrough probability distributions relative to each of the candidate constraint configuration are determined by a Beta distribution model or a Gaussian distribution model.

In some embodiments, the first budget distribution comprises the selected constraint configurations and budget counts of the selected constraint configurations selected from the candidate constraint configurations.

In some embodiments, the budget counts of the selected constraint configurations are not equal.

In some embodiments, the convergence of the first budget distribution is determined by a Markov Chain Monte Carlo (MCMC) model.

In some embodiments, the method further includes following operations. A maximum speed result is selected among the first circuit speed results and the updated circuit speed results. The candidate constraint configurations associated with the maximum speed result are utilized for implementing the target circuit.

In some embodiments, a method includes following operations. Existed circuit speed results of a target circuit under different candidate constraint configurations related to a constraint of the target circuit are accumulated. Breakthrough probability distributions relative to each of the candidate constraint configurations are determined. A budget distribution among selected constraint configurations is determined from the candidate constraint configurations according to the breakthrough probability distributions. The budget distribution includes the selected constraint configurations and budget counts of the selected constraint configurations. The budget counts of the selected constraint configurations are not equal. The selected constraint configurations in the budget distribution are utilized for implementing the target circuit and generating an updated circuit speed result of the target circuit.

In some embodiments, the circuit speed results are accumulated from at least one emulation round executed by a benchmark platform, and the updated circuit speed results of the target circuit are generated in another emulation round executed by the benchmark platform.

In some embodiments, the benchmark platform comprises an electronic design automation (EDA) tool.

In some embodiments, each of the breakthrough probability distributions describes a distribution of probabilities under one of the constraint configurations to obtain a breakthrough circuit speed result which exceeds all of the existed circuit speed results.

In some embodiments, the breakthrough probability distributions relative to each of the candidate constraint configuration are determined by a Beta distribution model or a Gaussian distribution model.

In some embodiments, the convergence of the budget distribution is determined by a Markov Chain Monte Carlo (MCMC) model.

In some embodiments, the method further includes following operations. A maximum speed result is selected among the existed circuit speed results and the updated circuit speed results. The candidate constraint configurations associated with the maximum speed result are utilized for implementing the target circuit.

In some embodiments, a system includes one or more processors and one or more programs including instructions. The instructions, when executed by the one or more processors, cause the system to: accumulate a plurality of first circuit speed results of a target circuit under different candidate constraint configurations; determine a plurality of breakthrough probability distributions relative to each of the candidate constraint configurations according to the first circuit speed results; determine a plurality of first selected constraint configurations from the candidate constraint configurations by sampling the breakthrough probability distributions; determine a first budget distribution among the first selected constraint configurations; determine a convergence of the first budget distribution; and, in response to that the first budget distribution is converged, utilize the first selected constraint configurations in the first budget distribution for implementing the target circuit and generating an updated circuit speed result of the target circuit.

In some embodiments, the system further includes instructions which, when executed by the one or more processors, cause the system to: in response to that the first budget distribution is not converged, generate inner circuit speed results according to the first budget distribution; combine the inner circuit speed results with the first circuit speed results as second circuit speed results; update the breakthrough probability distributions according to the second circuit speed results; determine a plurality of second selected constraint configurations from the candidate constraint configurations by sampling the breakthrough probability distributions; determine a plurality of second budget distribution among the second selected constraint configurations; determine a convergence of the second budget distribution; and, in response to that the second budget distribution is converged, utilize the second selected constraint configurations in the second budget distribution for implementing the target circuit and generating the updated circuit speed result of the target circuit.

In some embodiments, the system further includes instructions which, when executed by the one or more processors, cause the system to: select a maximum speed result among the existed circuit speed results and the updated circuit speed results; and utilize the candidate constraint configurations associated with the maximum speed result for implementing the target circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
accumulating a plurality of first circuit speed results of a target circuit under different candidate constraint configurations;
determining a plurality of breakthrough probability distributions relative to each of the candidate constraint configurations according to the first circuit speed results;
determining a plurality of first selected constraint configurations from the candidate constraint configurations by sampling the breakthrough probability distributions;
determining a first budget distribution among the first selected constraint configurations;
determining a convergence of the first budget distribution; and
in response to that the first budget distribution is converged, utilizing the first selected constraint configurations in the first budget distribution for implementing the target circuit and generating an updated circuit speed result of the target circuit.

2. The method according to claim 1, further comprising:
in response to that the first budget distribution is not converged, generating inner circuit speed results according to the first budget distribution;
combining the inner circuit speed results with the first circuit speed results as second circuit speed results;
updating the breakthrough probability distributions according to the second circuit speed results;
determining a plurality of second selected constraint configurations from the candidate constraint configurations by sampling the breakthrough probability distributions;
determining a second budget distribution among the second selected constraint configurations;
determining a convergence of the second budget distribution; and
in response to that the second budget distribution is converged, utilizing the second selected constraint configurations in the second budget distribution for implementing the target circuit and generating the updated circuit speed result of the target circuit.

3. The method according to claim 1, wherein the first circuit speed results are accumulated from at least one emulation round executed by a benchmark platform, and the updated circuit speed result of the target circuit is generated in another emulation round executed by the benchmark platform.

4. The method according to claim 3, wherein the benchmark platform comprises an electronic design automation (EDA) tool.

5. The method according to claim 1, wherein each of the breakthrough probability distributions describes a distribution of probabilities under one of the candidate constraint configurations to obtain a breakthrough circuit speed result which exceeds all of the first circuit speed results.

6. The method according to claim 1, wherein the breakthrough probability distributions relative to each of the candidate constraint configuration are determined by a Beta distribution model or a Gaussian distribution model.

7. The method according to claim 1, wherein the first budget distribution comprises the first selected constraint configurations and budget counts of the first selected constraint configurations selected from the candidate constraint configurations.

8. The method according to claim 7, wherein the budget counts of the first selected constraint configurations are not equal.

9. The method according to claim 1, wherein the convergence of the first budget distribution is determined by a Markov Chain Monte Carlo (MCMC) model.

10. The method according to claim 1, further comprising:
selecting a maximum speed result among the first circuit speed results and the updated circuit speed result; and
utilizing the candidate constraint configurations associated with the maximum speed result for implementing the target circuit.

11. A method, comprising:
accumulating a plurality of existed circuit speed results of a target circuit under different candidate constraint configurations related to a constraint of the target circuit;
determining a plurality of breakthrough probability distributions relative to each of the candidate constraint configurations;
determining a budget distribution among selected constraint configurations from the candidate constraint configurations according to the breakthrough probability distributions, wherein the budget distribution comprises the selected constraint configurations and budget counts of the selected constraint configurations, the budget counts of the selected constraint configurations are not equal; and
utilizing the selected constraint configurations in the budget distribution for implementing the target circuit and generating an updated circuit speed result of the target circuit.

12. The method according to claim 11, wherein the existed circuit speed results are accumulated from at least one emulation round executed by a benchmark platform, and the updated circuit speed result of the target circuit is generated in another emulation round executed by the benchmark platform.

13. The method according to claim 12, wherein the benchmark platform comprises an electronic design automation (EDA) tool.

14. The method according to claim 11, wherein each of the breakthrough probability distributions describes a distribution of probabilities under one of the candidate constraint configurations to obtain a breakthrough circuit speed result which exceeds all of the existed circuit speed results.

15. The method according to claim 11, wherein the breakthrough probability distributions relative to each of the candidate constraint configuration are determined by a Beta distribution model or a Gaussian distribution model.

16. The method according to claim 11, wherein the convergence of the budget distribution is determined by a Markov Chain Monte Carlo (MCMC) model.

17. The method according to claim 11, further comprising:
selecting a maximum speed result among the existed circuit speed results and the updated circuit speed result; and
utilizing the candidate constraint configurations associated with the maximum speed result for implementing the target circuit.

18. A system, comprising one or more processors and one or more programs including instructions which, when executed by the one or more processors, cause the system to:
accumulate a plurality of first circuit speed results of a target circuit under different candidate constraint configurations;
determine a plurality of breakthrough probability distributions relative to each of the candidate constraint configurations according to the first circuit speed results;
determine a plurality of first selected constraint configurations from the candidate constraint configurations by sampling the breakthrough probability distributions;
determine a first budget distribution among the first selected constraint configurations;
determine a convergence of the first budget distribution; and
in response to that the first budget distribution is converged, utilize the first selected constraint configurations in the first budget distribution for implementing the target circuit and generating an updated circuit speed result of the target circuit.

19. The system according to claim 18, further comprising instructions which, when executed by the one or more processors, cause the system to:
in response to that the first budget distribution is not converged, generate inner circuit speed results according to the first budget distribution;
combine the inner circuit speed results with the first circuit speed results as second circuit speed results;
update the breakthrough probability distributions according to the second circuit speed results;
determine a plurality of second selected constraint configurations from the candidate constraint configurations by sampling the breakthrough probability distributions;
determine a plurality of second budget distribution among the second selected constraint configurations;
determine a convergence of the second budget distribution; and
in response to that the second budget distribution is converged, utilize the second selected constraint configurations in the second budget distribution for implementing the target circuit and generating the updated circuit speed result of the target circuit.

20. The system according to claim 18, further comprising instructions which, when executed by the one or more processors, cause the system to:
select a maximum speed result among existed circuit speed results and the updated circuit speed result; and
utilize the candidate constraint configurations associated with the maximum speed result for implementing the target circuit.

* * * * *